United States Patent [19]
Fletcher et al.

[11] 4,045,795
[45] Aug. 30, 1977

[54] CHARGE-COUPLED DEVICE DATA PROCESSOR FOR AN AIRBORNE IMAGING RADAR SYSTEM

[76] Inventors: James C. Fletcher, Administrator of the National Aeronautics and Space Administration, with respect to an invention of Wayne E. Arens, Sierra Madre, Calif.

[21] Appl. No.: 589,119

[22] Filed: June 23, 1975

[51] Int. Cl.² .................. G01S 7/30; G01S 9/02
[52] U.S. Cl. .................. 343/5 CM; 343/5 DP; 343/10; 343/100 CL
[58] Field of Search ....... 343/5 R, 5 DP, 10, 100 CL, 343/5 VQ, 5 CM

[56] References Cited
U.S. PATENT DOCUMENTS

| | | | |
|---|---|---|---|
| 3,181,145 | 4/1965 | Towle et al. ........................ | 343/5 DP |
| 3,683,373 | 8/1972 | Barnes et al. ...................... | 343/5 DP |
| 3,737,900 | 6/1973 | Vehrs, Jr. ......................... | 343/5 DP X |
| 3,797,016 | 3/1974 | Martin ............................. | 343/5 DP X |
| 3,900,846 | 8/1975 | Gibbon et al. ..................... | 343/5 DP X |
| 3,942,034 | 3/1976 | Buss .............................. | 343/7.7 X |

*Primary Examiner*—Malcolm F. Hubler
*Attorney, Agent, or Firm*—Monte F. Mott; Paul F. McCaul; John R. Manning

[57] ABSTRACT

Processing of raw analog echo data from a side-looking synthetic aperture radar receiver into images on board an airborne radar platform is made feasible by utilizing charge-coupled device (CCD) semiconductor technology. CCD circuits are utilized to perform input sampling, presumming, range correlation and azimuth correlation in the analog domain. These radar data processing functions are implemented for "single-look" or "multiple-look" imaging radar systems.

15 Claims, 28 Drawing Figures

*Fig. 4*

LINE OF APPARENT TARGET MOTION

FIG_13(a)

FIG_13(b)

FIG_14

FIG_15

FIG_22

FIG_23

CHARGE-COUPLED DEVICE DATA PROCESSOR FOR AN AIRBORNE IMAGING RADAR SYSTEM

ORIGIN OR THE INVENTION

The invention described herein was made in the preformance of work under a NASA contract and is subject to the provisions of Section 305 of the National Aeronautics and Space Act of 1958, Public Law 85-568 [72 Stat. 435; USC 2457].

BACKGROUND OF THE INVENTION

The present invention relates generally to improvements in side-looking synthetic aperture imaging radar systems wherein the dispersed radar echo data is processed into images in the analog domain.

Radar imaging using side-looking synthetic aperture radar techniques has been, and continues to be, the only viable means of achieving high resolution imagery through planetary atmospheric cloud covers. Scientific applications of these radar techniques that are of immediate interest include Venus surface mapping as well as global coverage of the Earth's land masses and oceans. For such applications the digital data processing required to produce true imagery data on board a spacecraft or airborne radar platform appears impractical from the standpoint of cost, complexity, power, weight and size. The prior art approach is to utilize sophisticated ground-based digital and/or optical systems to perform the complex range and azimuth correlations required for transforming the dispersed radar instrument output data into image resolution elements. As a consequence, only minimal processing is accomplished on board the spacecraft. Since no means is yet known for compressing uncorrelated radar echo data (other than presumming and time expansion), vast quantities of "raw" data must be transmitted to Earth for processing. This typically requires reliable, high-speed (1 to 50 mbps record rates) and high capacity (greater than $1 \times 10^9$ bits) tape recorders for storage of this data. The data rate and volume problem becomes even more acute when multiple-looks are required. In multiple-look systems, the data rate and volume (if the data is not processed to image form) increases directly as the number of looks.

On-board radar data processing for side-looking synthetic aperture imaging radar systems have been limited to techniques in the digital domain. Following pulse sampling, a high speed analog-to-digital converter is utilized for digitizing the samples. After digitization, the only additional operation that the prior art has found to be practical to accomplish on-board for most applications is presumming. The requirements for digitally carrying out the range and azimuth correlations on board the airborne radar platform becomes overwhelming in terms of speed and complexity. For example, just to store the digital words necessary to carry out one correlation in azimuth would typically require a high-speed, solid-state memory having a capacity in excess of $1 \times 10^7$ bits. The logic operations would have to be accomplished at nanosecond rates, reflecting the need for extremely high power. Although digital processors for processing the radar image have been built, they have been totally impractical for spacecraft use from the standpoint of size, weight, power and cost. The prior art approach to airborne radar platforms is therefore, as noted above, extremely limited.

Figures 1, 2, 3A, 3B:
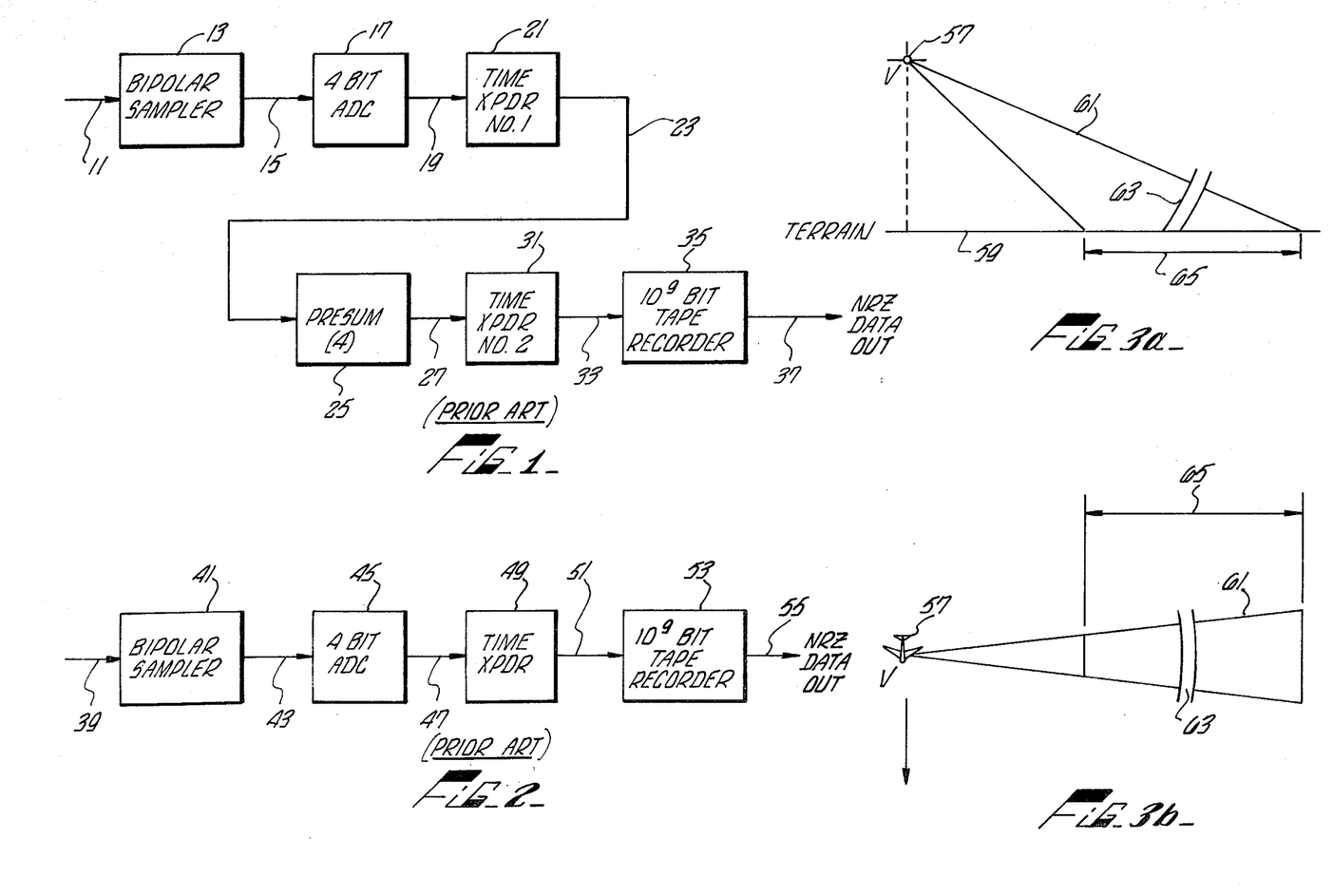
FIG. 1 is a block diagram representation of prior art on-board radar data processing for a single-look system.
FIG. 2 is a block diagram representation of prior art on-board radar data processing for a four-look system.
FIG. 3(a) is an elevation sketch showing the geometrical relationships of a synthetic aperture radar.
FIG. 3(b) is a plan sketch showing the geometrical relationships of a synthetic aperture radar.

FIG. 1 illustrates a typical prior art single-look synthetic aperture radar system having a range resolution of 25 meters with a range swath of one hundred kilometers, and an azimuth resolution of 25 meters. The bandwidth of the received signal is 16 MHz. The 16 MHz return signal at processor input 11 is sampled at the Nyquist rate by a bi-polar sampler 13 that provides 32 msps at its output 15. These samples are digitized in a four-bit analog-to-digital converter 17 to a 128 mbps signal at its output 19. This 128 mbps signal is supplied to a first time expander 21 that provides a 56 mbps signal at its output 23. This signal is supplied to a presummer 25 having a presum factor of 4 that provides a 56 mbps signal at its output 27. A second time expander 31 consequently provides a 14 mbps signal at its output 33 to a tape recorder 35 having a $10^9$ bit capacity. The output of the recorder 35 is NRZ data at 37 which would be transmitted to Earth for processing. For a radar platform velocity of 7500 meters per second the azimuth swath length per orbit would be limited to about 525 kilometers. The recorder would be loaded in about 70 seconds. It may be feasible to help this problem by one-bit quantization. However, the potential degradation in quality due to the total loss of amplitude information makes one-bit quantization very questionable. The four bits utilized here appears to be the practical minimum for most imagery applications. Besides this severe limitation in the azimuth swath length, the extremely high digital rates utilized require high-speed logic and numerous logic functions to accomplish the sampling and quantization functions prior to the presumming operation. Although major logic systems are required to perform these functions, the ultimate information extracted therefrom still does not provide an image or useful data from which information could be extracted. Also a $10^9$ bit capacity tape recorder has been assumed. Spacecraft tape recorders having this capacity and the capability of recording reliably at a rate of 14 mbps over an extremely long period of time are possible but difficult to obtain. Besides the above problems, the system of FIG. 1 does not provide for a multiple-look capability. A multiple-look capability is a requisite for a clear, speckle-free image.

Assuming that a multiple-look capability of four is to be implemented by the prior art approach, the system illustrated in FIG. 2 would be representative. Thus, the 16 MHz received signal is supplied at the input 39 to bi-polar sampler 41 that produces at the Nyquist rate, 32 msps at output 43. A four-bit analog-to-digital converter 45 quantizes the samples into a 128 mbps signal at output 47. The time expander 49 reduces this rate of 56 mbps at output 51. Since a four look capability is required, the 56 mbps signal is recorded by a $10^9$ bit capacity tape recorder 53. This data rate to the recorder is increased by a factor of four over the system in FIG. 1 and thereby because of the radar platform velocity of 7500 meters per second, only about 18 seconds of data can be gathered on each orbit. This would be totally unexceptable for most applications. Also a reliable long-life spacecraft tape recorder having a 56 mbps record rate is probably unrealistic.

OBJECTS AND SUMMARY OF THE INVENTION

An object of this invention is to provide a radar data processor that will reduce the power, weight and cost requirements of processing radar images on board an aircraft or spacecraft.

Another object of this invention is to provide a radar data processor that will reduce the on-board data storage and data rate requirements of an airborne imaging radar system.

Yet another object of this invention is to provide a radar data processor that will facilitate the processing of raw radar data into correlated imaging data on board an airborne radar platform without the use of digital or optical correlation techniques.

A further object of this invention is to provide a lightweight, small radar data processor that can process raw "multiple-look" radar data into radar imagery data on board an airborne radar platform.

The above objects, as well as the general purpose of the present invention, are accomplished in the following manner. Amplitude sampling of the radar data from the receiver is performed in the analog domain by a multiplexer-demultiplexer pair directing charge values into and out of a parallel array of CCD shift registers. The sampled analog amplitudes may be presummed, in the case of a "single-look" system by a pair of parallel-input CCD registers. If improved signal-to-aliasing performance is required, a weighted presummer using either a CCD recursive filter or CCD transversal filter could be implemented. In the case of a multiple-look in azimuth system, the presumming operation may be omitted. Range correlation is performed by weighted coefficient transversal filtering implemented by using charge-coupled devices. Azimuth correlation is performed on the range correlated output charges by providing weighted coefficient CCD transversal filtering for each set of azimuth elements representing a range bin location. The resulting range and azimuth correlated charge samples may be converted into digital imagery data and compressed for transmission or storage.

BRIEF DESCRIPTION OF THE DRAWINGS

Other objects and many of the attendent advantages of this invention will be readily appreciated as the same become better understood by reference to the following detailed description when considered in conjunction with the accompanying drawings in which like reference numerals designate like parts throughout the figures thereof and wherein:

FIG. 15 is a block diagram illustration of a CCD transversal filter;

FIG. 18 is a block diagram illustration of how CCD's can be used to process images from radar echoes;

DESCRIPTION OF THE PREFERRED EMBODIMENTS

When an image of some physical characteristic is needed, it is desirable that the resolution in two orthogonal directions be approximately equivalent. This presents a problem to conventional radar sets which could be utilized to produce an image of the radar cross section of a section of terrain. The resolution of the conventional radar in the radial direction depends directly upon signal bandwidth. Well-known pulse compression techniques permit signal bandwidth to be expanded with negligible sensitivity loss so that adequate resolution may be realized for many imaging applications. This does not hold true for azimuth resolution, however. Conventional radar azimuth resolution depends ultimately upon the antenna beam width. The antenna beam width is reduced by increasing the size of the aperture, increasing the carrier frequency, or both, for long range imaging. This approach cannot provide an azimuth resolution which is comparable to the range resolution that can be realized easily with modern pulse compression techniques.

The synthetic aperture radar system provides a convenient solution of this problem by trading data processing capability for aperture size. In principle there is no difference between an extremely large real antenna and a small real antenna that successively occupies all the positions that would be occupied simultaneously by the large real antenna, provided that the data that is successively collected by the small antenna is properly stored and subsequently combined in a simulation of the large real antenna. A synthetic aperture radar system satisfies this condition and implements a system where a small antenna moves past the scene and records echo data to permit comparable range and azimuth resolution to be realized in an image of the scene after the recorded data has been properly processed.

FIGS. 3(a) and 3(b) provide a pictorial illustration of the basic parameters of a synthetic aperture radar (SAR) system. The information required in order to provide a radar map image are the correlated range and azimuth resolution elements.

Figure 7:
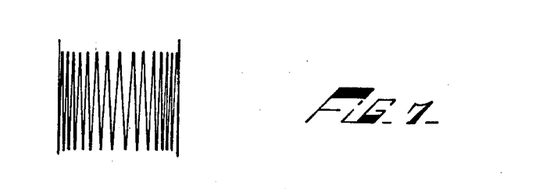
FIG. 7 is a waveform illustration of a chirp function.

Consider first the process involved in range correlation and the parameters that determine range resolution. According to well-known radar theory, the accuracy with which the range of a target can be measured depends on the signal bandwidth and signal-to-noise ratio. That is, the RMS error in the measurement of time delay for linear frequency modulated pulse compression signals is expressed by the equation $$\delta t = \frac{\sqrt{3}}{\pi B(2E/N_o)^{\frac{1}{2}}}$$

where:
 $B$ = chirp signal bandwidth
 $2E/N_o$ = peak signal-to-rms-noise ratio
 $E$ = energy in received pulse
 $N_o$ = receiver system noise spectral density referred to receiver input This equation illustrates that range resolution improves directly as the chirp signal bandwidth is increased for a given signal-to-noise ratio $2E/N_o$. The format of a typical pulse compression or chirp signal is illustrated in FIG. 7. Linear frequency modulated chirp pulse compression is one example of spread spectrum techniques which have the properties that probability of detection and resolution are essentially independent quantities. The amount of energy which the transmitter puts into the pulse determines the probability of detection independently of signal bandwidth, assuming a matched filter receiver. The signal bandwidth then is the major factor which determines range resolution. The principal signal parameter of interest therefore is the radio frequency signal chirp bandwidth. This parameter defines the compressed pulse width.

Figure 4:
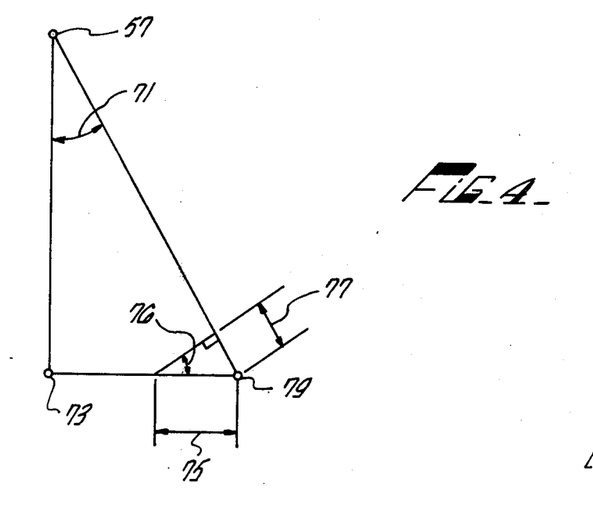
FIG. 4 is a sketch illustrating the geometrical relationships between range, resolution and bandwidth.

Traditionally, resolution is defined as the separation which must exist between two equally strong targets in order for their individual compressed pulse responses to intersect 3dB below their peak response level. The compressed pulse width, which equas the chirp bandwidth, gives the range resolution for an imaging system in the special case where the radar platform lies in the plane of the scene being imaged. However, in a side-looking synthetic aperture radar system. the radar will be located above the plane being mapped. This means that the compressed pulse width must be projected into the plane of the scene in order to obtain the effective range resolution appropriate to the scene. FIG. 4 illustrates an airborne radar platform 57 in relation to a target point 79 on the terrain along with a sub-point 73 which is closest to the radar platform 57. The angle 71 is called the Nadir angle. Angle 76 equals angle 71. The geometrical relationship of this figure illustrates the slant-range resolution 77 and the scene-range resolution 75. If the slant-range resolution is $$\delta s = (c\tau_c/2)$$

where:
 $c$ = speed of light
 $\tau c$ = compressed pulse width measured at 3dB points
 $\delta s$ = slant-range resolution
the scene-range resolution is $$\delta R = \frac{c\tau_c}{2 \sin \theta} = \frac{0.45c}{\Delta f \sin \theta}$$

where:
 $\gamma R$ = scene-range resolution
 $\Delta f$ = chirp bandwidth
 $\theta$ = angle 76

Assuming a typical look angle ($\theta$) of 20°, a 25 meter range resolution would require a 16 MHz chirp pulse bandwidth. A 50 meter range resolution would require an 8 chirp pulse bandwidth.

Figure 5:
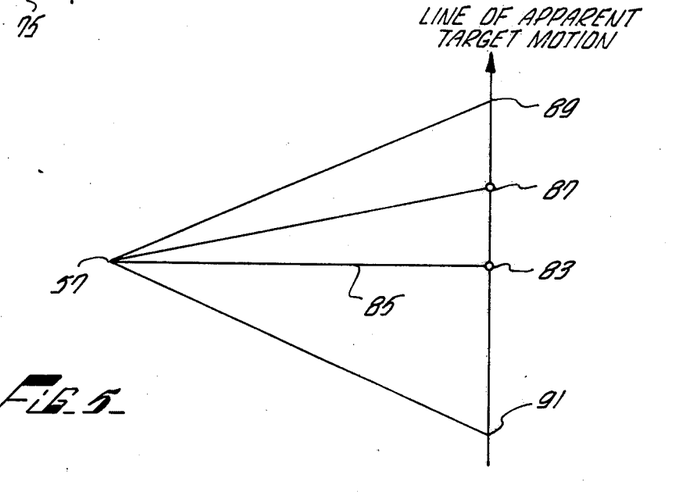
FIG. 5 is a sketch illustrating the synthetic aperture radar azimuth geometry.
Figure 6:
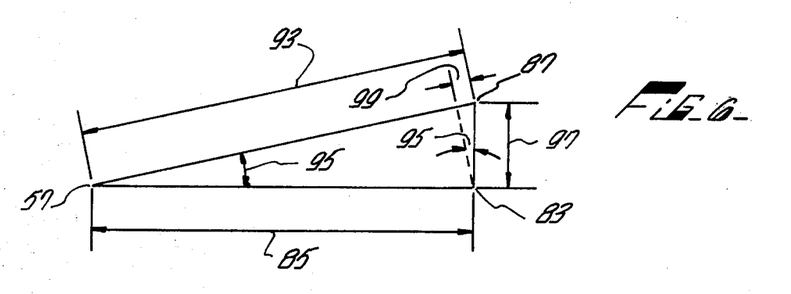
FIG. 6 is a sketch illustrating the synthetic aperture radar distance relationships.

Consider now the azimuth correlation process. FIG. 5 illustrates the geometric relationships of a SAR when the radar platform is thought of as stationary, with target motion being a straight line as shown. The synthetic aperture radar platform is located at point 57. Time t is zero when the target is at the point of closest approach to the radar 57. This is the point 83, having a minimum range value $R_O$, 85. Data is assumed to be available from the time the target enters the 3dB beam width point of the real aperture and until it leaves the 3dB beam width point on the other side, travelling in the direction indicated by the arrow. The entering 3dB point is point 91. The target travels through points 83 and 87 and leaves the 3dB beam width at point 89. At some time $t$, the target is seen in FIG. 6 to be displaced a distance 97 between point 83 and 87. The range, as a function of time, is given by the equation:

$$R(t) = (R_O^2 + V^2 t^2)^{\frac{1}{2}}$$

where:
 $R(t)$ = the distance 93 on FIG. 6
 $R_O$ = the distance 85 on FIG. 6
 $Vt$ = the distance 97 on FIG. 6

The same figure illustrates the velocity relationships. To obtain the Doppler frequency expression it is necessary to first obtain an expression for the first derivative with respect to time of the range between the radar platform and the target. The velocity vector V is projected onto the vector between the radar set and the target. The projection is the desired range rate $$\dot{R} = V \sin \beta$$

where:
 $V$ = the velocity of the target moving from point 83 to point 87
 $\beta$ = the angle 95
 range rate = the distance 99 on FIG. 6

From the geometric relations of FIG. 6, it can be seen that there is a quadratic phase modulation in the Doppler signal in azimuth which is analogous to the range chirp modulation discussed above. The major conceptual difference is in the signal duration. The range chirp pulse has a rather well defined start/stop duration. The azimuth chirp modulation however has no such well defined time period. There is an arbitrary matter of azimuth signal duration. As a practical matter, the effective azimuth signal duration is defined by the signal processor. The azimuth resolution distance for an ideal processor which is unweighted is obtained by multiplying the compressed pulse width by velocity. This can be expressed by the equation:

$$\delta_{AZ} + V\tau c = \frac{0.45 \lambda R_O}{V T_{AZ}}$$

where:
λ = carrier wavelength
$R_O$ = minimum range separation
V = velocity of target
$T_{AZ}$ = azimuth correlation time This equation shows that the azimuth resolution can be improved only by increasing the azimuth correlation time, assuming that the geometrical parameters of minimum range separation between target and radar platform carrier wavelength and velocity are fixed. For an azimuth resolution of 25 meters, the azimuth correlation time must be approximately one-half second.

It should be recalled at this time that the synthetic aperture radar is based on the premise that there is no difference between an extremely large antenna and a small real antenna that successively occupies all the positions which are simultaneously occupied by the large antenna, provided that data is successively collected, stored, and subsequently combined in an effective simulation of the larger antenna. This is the basic function of the imaging processor in a synthetic aperture radar. As the small antenna moves past the scene being imaged, successive radar echo returns are stored in a bank of matched filters and are subsequently processed in a synthetic simulation of the larger antenna aperture.

Figures 8, 20:
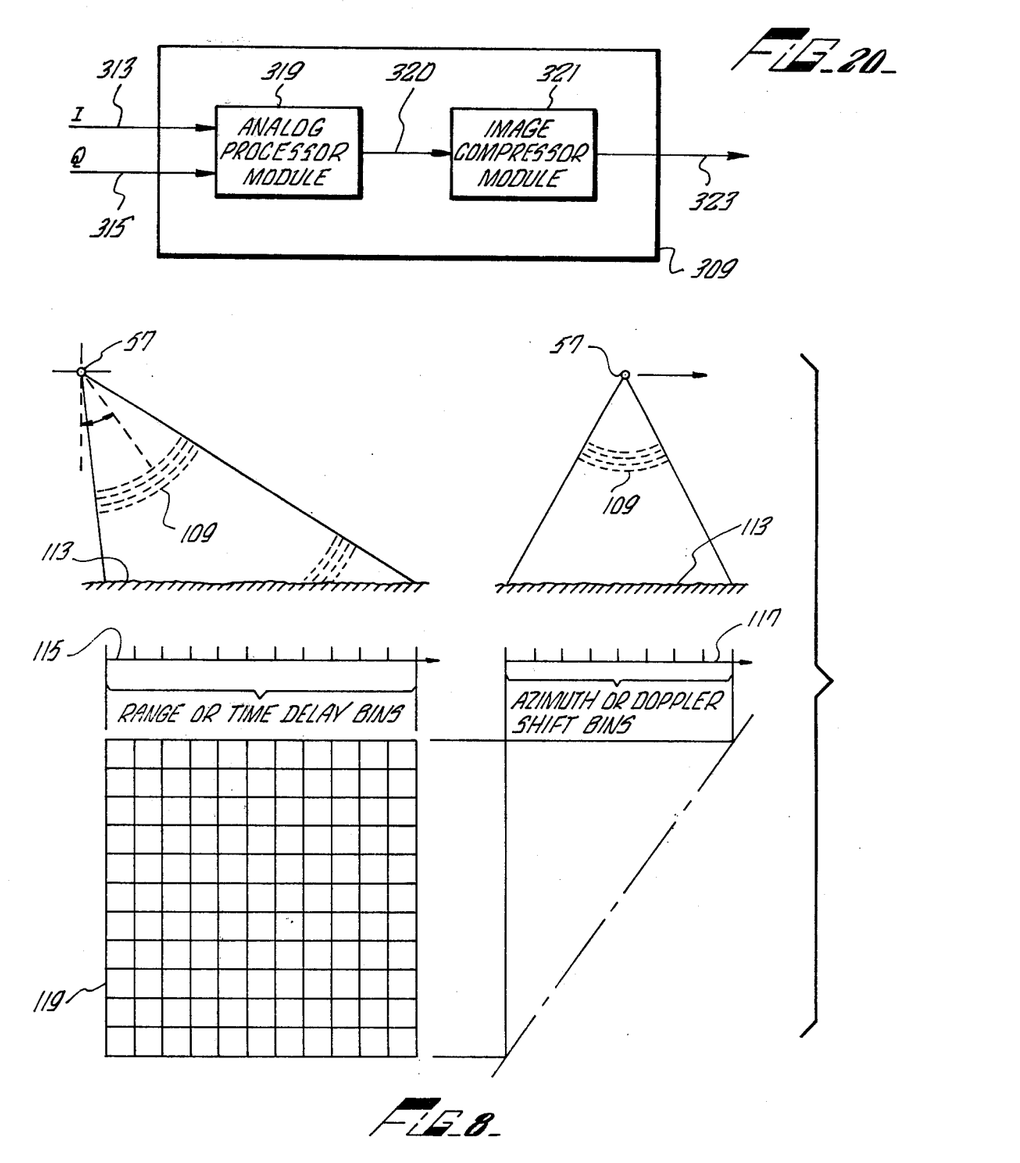
FIG. 8 is a diagrammatic illustration of a radar map.
FIG. 20 is a block diagram of an image processor module.

This can be more clearly seen by reference to FIG. 8. A synthetic aperture radar platform 57 emits high energy bursts 109 at a given repetition rate to the surface as echoes, which when properly superimposed, form a radar map 119 of varying brightness. This is accomplished by dividing the resulting echo returns into a plurality of range bins 115 where the number of range bins defines the desired range resolution. The returns are then stored in a bank of azimuth filters, at least one for each range bin. The columns of the radar map 119 represent different time delays or range while the rows of the radar map 119 represent the different azimuth positions 117. The number of stages required by the azimuth filters is determined by the azimuth processing time (that is the number of pulse repetition frequency echo returns required to synthetically simulate the larger antennsa aperture) needed to achieve the desired azimuth resolution.

The high energy bursts transmitted by the radar platform 57 typically will take the form of a chirp function as illustrated in FIG. 7. A chip function is a frequency modulated signal covering a frequency range from $F_0$ to $F_1$. Pulse compression by using these chirp functions provides a finer time discrimination and increases the range resolution.

Figure 9:
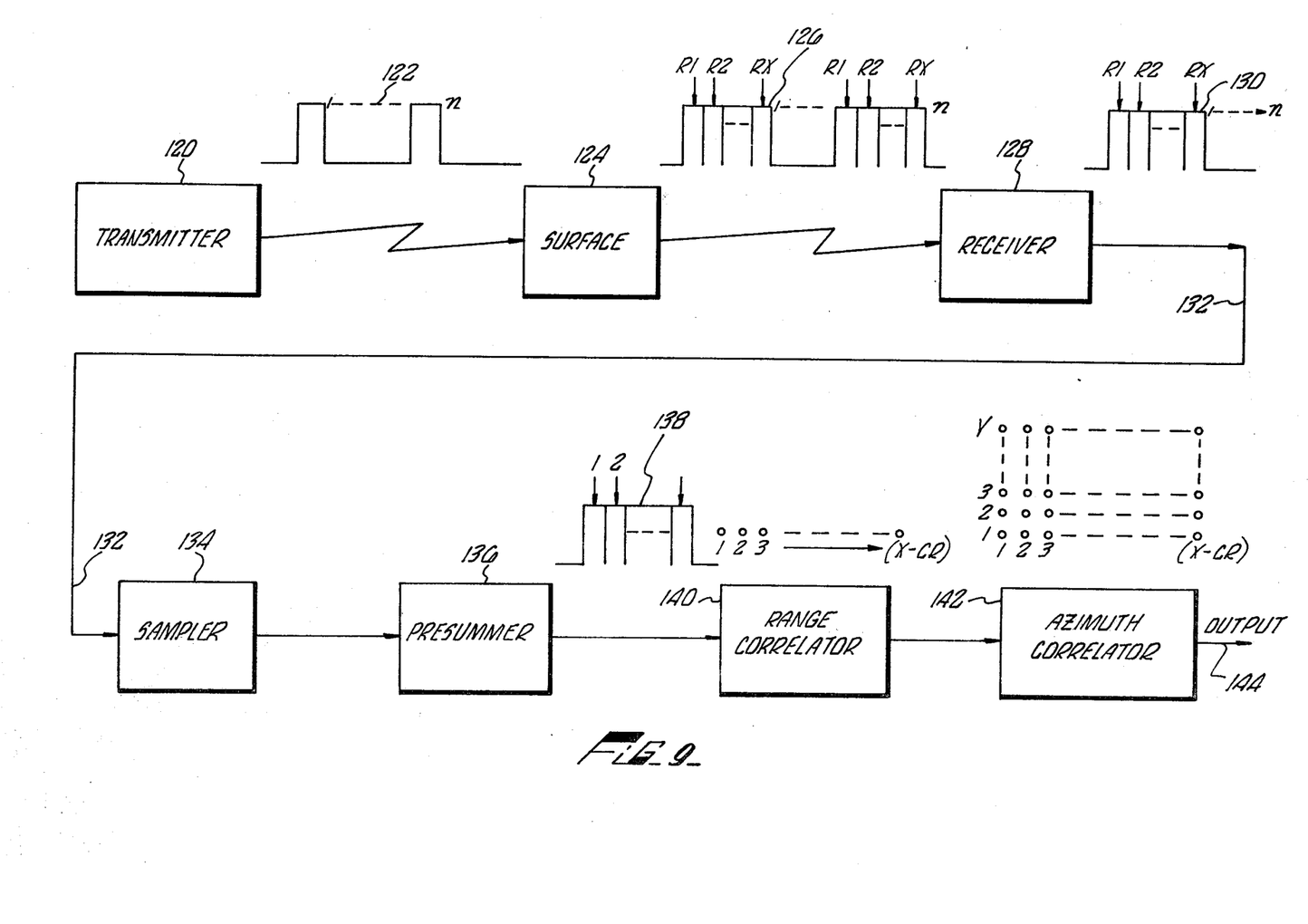
FIG. 9 is a block diagram illustration of the process utilized for obtaining the actual resolution elements of a radar image.

Referring now to FIG. 9, the general elements of a synthetic aperture radar processor and its relation to the transmitter and receiver are illustrated. The radar transmitter 120 generates n chirp signal 112, such as illustrated in FIG. 7, to be transmitted to a surface 124 to be imaged. The surface 124 reflects these chirp signals back to a receiver 128 located on the airborne radar platform in the form of n echo pulses. Each echo pulse corresponds to a given azimuth position and contains all the range information for that azimuth position. Echo pulse 126, for example, defines a particular azimuth position, its leading edge defining the range of the shortest distance, its trailing edge defining the range of the longest distance. The duration of the pulse 126 contains all the range elements $R_1$ through $R_x$ for a particular azimuth parameter. The receiver 128 translates the frequency spectrum for the echo pulses to a base band frequency and supplies these echo pulses 130 over line 132 to a data sampler 134. The sampler 134 samples each of the n echo pulses in amplitude for each of the X range elements in that pulse.

Some data rate reduction for a given radar bandwidth may be obtained by a presumming operation prior to correlation. Because of the extremely large resolution capability in the azimuth direction, presumming can be used without significant degradation. The amount of presumming is selected to achieve a resolution comparable to the range resolution. Assuming a presum number of four for the presummer 136 means that corresponding range samples of each of four echo pulses is summed. The resultant single pulse 138 corresponds to a given azimuth and represents an average value over four pulses.

The output of the presummer 136 is supplied to the range correlator 140. The initial samples from the presummed echo pulse, proportional in number to the range compression ratio, are used to load the range correlator. For each subsequent sample shifted into the range correlator, a correlation is performed by summing the weighted outputs of each stage of the correlator, i.e. for each correlation, one range sample is removed and a new one added. A range correlated line corresponding to a given azimuth is therefore generated for each presummed echo pulse received by the range correlator.

To accomplish the azimuth correlation, the range correlated lines must be supplied to the azimuth correlator 142. The azimuth correlator receives and stores range correlated lines until it has stored a number of lines, Y, proportional to the azimuth compression ratio. Once the azimuth correlator matrix is filled, a correlation is achieved in each range bin by summing the weighted contents of that bin over the Y azimuth points. Such a correlation results in a single image resolution element for that bin. When all range bins have been so correlated, one range correlated line is removed from the azimuth correlator matrix, a new one added, and the range bin correlations in azimuth repeated. An entire range image line is therefore generated for each presummed echo pulse. The azimuth correlator 142 supplies the image resolution elements that correspond to one range line per presummed echo pulse on line 144. As will be explained hereinafter, this data, since it is now correlated in range and azimuth, may be compressed by well known techniques, before storing, or transmitting it to other locations.

In order to perform sampling, presumming, range correlation and azimuth correlation on board the radar platform the present invention contemplates the use of charge transfer semi-conductor devices.

Figure 10:
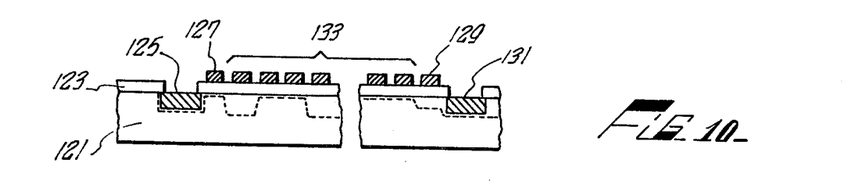
FIG. 10 is a cross-section illustration of a charge-coupled device.

The development in recent years of charge transfer semiconductor devices as a result of the MOS-FET technology has lead to making analog shift registers practical. An article by Gilbert F. Amilio entitled "Charge-Coupled Devices", pages 23 – 31 in *Scientific American*, Volume 230, No. 2, Feb., 1974 explains the structure and analogous operation of such a charge-coupled device (CCD). Another teaching of such devices can be found in U.S. Pat. No. 3,814,955 issued to Yokichi Itoh et al in 1974. Briefly, a CCD consists of a metal oxide and silicon configuration as shown in FIG. 10. A silicon dioxide layer 123 is deposited on a silicon substrate P material 121. A plurality of metal transfer electrodes 133 are deposited on the silicon dioxide layer 123. An N material input diode 125 is formed in the silicon substrate 121 to provide a coupling diode which for convenience is called an input diode. An N material 131 is formed in the silicon substrate 121 to effectively provide an output diode. Electrode 127 will effectively act as the input gate, and electrode 129 will effectively act as the output gate. By pulsing the transfer electrodes in sequence, it is possible to move potential wells for minority carriers along the surface of the silicon substrate 121. Packets of electrons may be transferred into a potential well under one of the transfer electrodes 133 and from there transferred, virtually intact, from potential well to potential well beneath the electrodes, across the device to the output gate 129 and into output diode 131.

Figure 11:
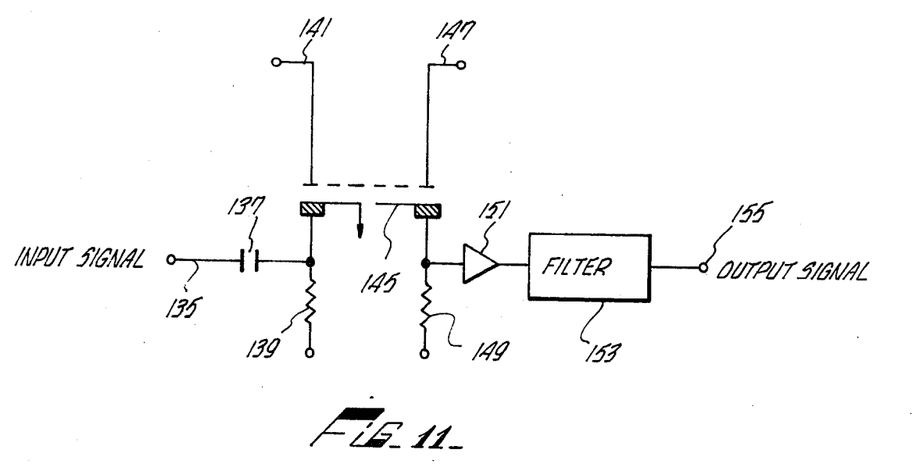
FIG. 11 is a circuit illustration of the electrical connections to a charge-coupled device.

One of a number of methods that may be used for accomplishing the shift register function by connection to a CCD device is illustrated in FIG. 11. The input signal on line 135 is coupled by a capacitor 137 to the input diode at the time the input gate 143 is held positively biased by way of a resistor 139. When the first transfer electrode, over the first potential well is pulsed, a current that is dependent on the potential of the input diode will then flow into this well from the diode. When the first transfer electrode turns off, the current flow stops. The generated charge packet can then be transferred along the device. The signal may be either applied to the input diode through the capacitor 137 or the diode may be held at a fixed bias and the signal applied to the input gate directly.

The charge packets are moved across the device, collected at the reverse biased output diode 145 and amplified by amplifier 151. The output diode 145 is reverse biased by resistor 149 at input 147. Since the maximum bandwidth of an analog signal sampled at a frequency $f$ is just $f/2$ the charge packets are delivered to the output amplifier 151 as current spikes. A low-pass filter 153 having a bandwidth equal to $f_0/2$ is used in the output circuit to smooth the current spikes into a continuous analog signal and minimize the pick up at frequencies of $f_0$ and above from the driving pulses.

Figure 12:
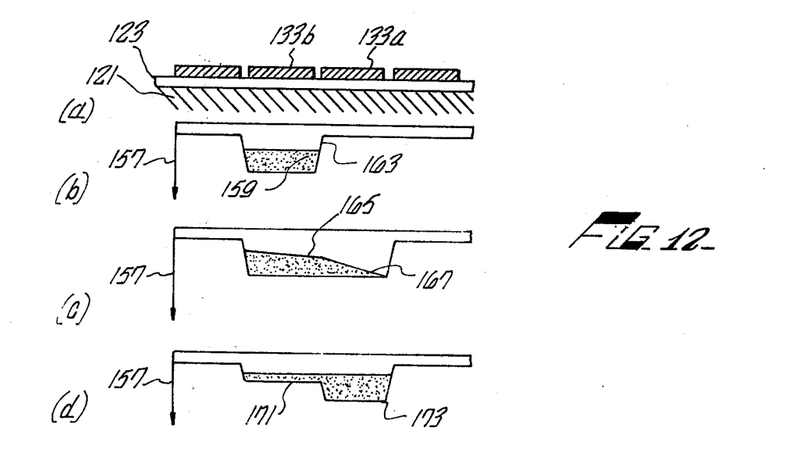
FIGS. 12(a), 12(b), 12(c) and 12(d) are illustrations of the transfer of a charge from beneath one electrode to another in a charge-coupled device.

To better understand the charge transfer operation within the CCD device from electrode to electrode reference should now be made to FIG. 12. FIG. 12(a) shows a cross sectional view of the CCD device as a silicon dioxide layer 123 being deposited on a silicon substrate 121 with a plurality of metal electrodes 133 spaced along the silicon dioxide layer 123. FIG. 12(b) is a graphic illustration of surface potential, along axis 157, versus distance along the silicon dioxide layer of the CCD device in FIG. 12(a). FIG. 12(b) shows a charge 159 at rest beneath the metal electrode 133b. This figure illustrates that electrode 133b is the only one that is creating a surface charge beneath its immediate area. The surface charge beneath electrode 133a, for example, is basically zero. Referring now to FIG. 12(c), the graph illustrates a potential being placed on metal electrode 133a that is equal to the potential being placed on 133b, causing the charge 165 under electrode 133b to flow towards area 167 under electrode 133a. Thereby, it can be seen that by lowering an adjacent metal electrode to the same potential as the electrode containing a charge thereunder, a charge transfer is initiated. As the charge begins to move from one electrode to the other, the electrode that is considered the source of the charge is raised to a zero potential 171 as shown in FIG. 12(d), thereby completing the charge transfer 173 from under electrode 133b to under electrode 133a.

Further information in regard to the use of CCD's for analog signal processing may be obtained from papers that were given at the 1974 IEEE International Convention and Exposition in March of 1974. Three papers were given on this subject. They are titled "Applications of Charge Transfer Devices to Analog Signal Processing" by Dennis D. Buss and Walter H. Bailey; "CCD's for Discrete Analog Signal Processing" by D. R. Lamp, M. H. White, J. H. Memms, W. R. Webb and G. A. Gilmore; and "A Programmable Transversal Filter Using Charge Transfer Devices" by J. J. Timan, W. E. Engler and R. D. Baertsch.

Figure 13A:
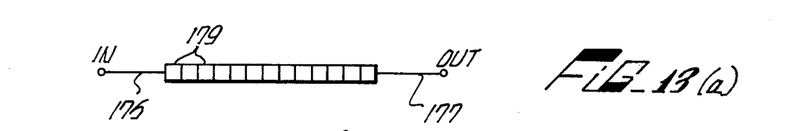
FIG. 13(a) is an illustration of a CCD serial shift register.

FIG. 13(a) is a diagrammatic illustration of a CCD shift register constructed according to the principles outlined in connection with FIGS. 10, 11 and 12. The shift register would consist of an input 175, a plurality of stages 179 and an output 177.

Figure 13B:
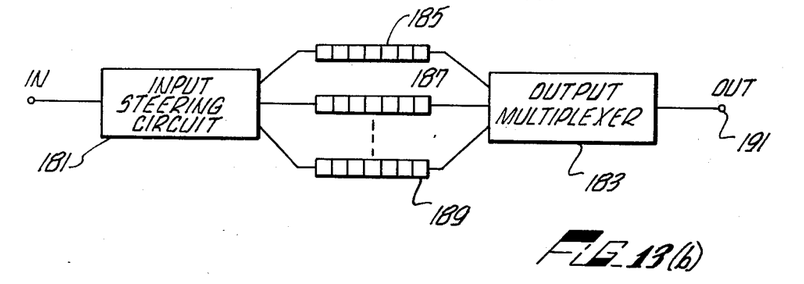
FIG. 13(b) is a block diagram illustration of a sampling circuit.

In order to provide the data sampler function required in the processor illustrated in FIG. 9, the configuration shown in FIG. 13(b) may be constructed. A plurality of serial CCD shift registers 185, 187, 189 all their inputs connected to an input steering circuit 181 and all their outputs connected to an output multiplexer 183. Assuming that four serial registers were connected between the input steering circuit 181 and the output multiplexer 183, the input steering circuit would sample the signal at input 175 supplying the first register 185 with samples 1, 5, 9, etc., the second register 187 with samples 2, 6, 10, etc. and the fourth register 189 with samples 4, 8, 12, etc. Upon loading all of the registers, the output multiplexer 183 would access the registers so that the samples would come out in their original order i.e. 1, 2, 3, etc. on output line 191. The circuit of FIG. 13(b), besides sampling the input waveform, provides sample rate reduction. The input rate of each CCD register would be $1/n$ of the input sampling rate where $n$ is the number of shift registers utilized. Furthermore, the samples are stored in the CCD shift registers during the input pulse sampling but may be read out in non-real time during the much longer period between pulses. Therefore, the output rate may be reduced with respect to the CCD register input rate in proportion to the incoming pulse duty cycle.

Figure 14:
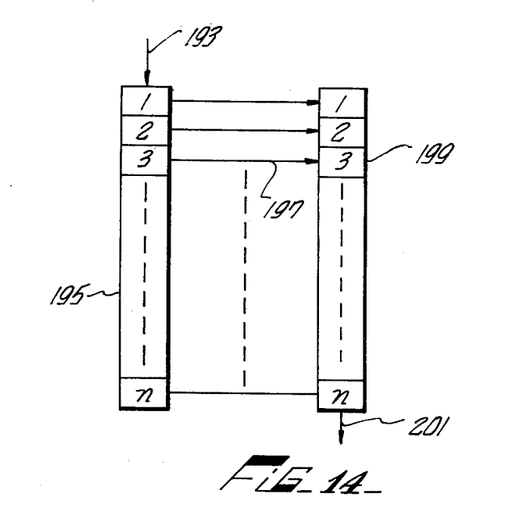
FIG. 14 is a block diagram illustration of an unweighted CCD presumming circuit.

The presummer function, as defined in the synthetic aperture radar system of FIG. 9 can be accomplished by CCD shift registers in the manner illustrated in FIG. 14. The pulses from the input sampler would be received by a serial-to-parallel CCD serial shift register 195 at a serial input 193. A common transfer pulse would then transfer all the charges stored in register 195 over parallel output lines 197 to parallel input/serial output CCD register 199. This transfer pulse at the same time would clear all the charges stored in register 195. The process would then be repeated for the next series of samples stored in register 195. Register 195 would again have its contents transferred into corresponding stages of register 199. The two charges would be linearly summed therein and stored. Such linear addition is the result of the inherent operation of the CCD device since it provides for a linear accumulation of charge.

The most important application, however, of the CCD shift register is its use for transversal filtering, as illustrated in FIG. 15. A transversal filter is constructed from a serial input/parallel output CCD shift register 205 a weighting function 209, and a summing network 213. The weighting function has a plurality of fixed or programmable weighting coefficients 211 equal in number to the outputs from the CCD shift register 205. The signals are shifted into the transversal filter at input 203 and shifted out of the summing function 213 at output 215. A comprehensive analysis of CCD type transversal filters can be found in an article published in the IEEE Journal of Solid State Circuits of April 1973 entitled "Transversal Filtering Using Charge Transfer Devices" by Dennis D. Buss, Dean R. Collins, Walter E. Bailey and C. Richard Reeves. Basically, the filter network of FIG. 15 will nondestructively correlate the input signal, when shifted through the register, with the desired correlation function defined by the weighting network 209.

The transversal filter of FIG. 15 consists of a sampling stage followed by M delay stages D, each of which delays the signal by a time equal to an integral number (for purposes of example, 1) of clock periods TC. The signal is nondestructively sampled at each delay stage and multiplied by the appropriate weighting coefficient $h_K$ (where $K = 1$ to $M$). The weighted signals are then summed to give the filter output. The weighting coefficient $h_K$ determines the impulse response of the filter (in other words, the output that results when a single sample of unit amplitude is supplied to the input).

Figure 16:
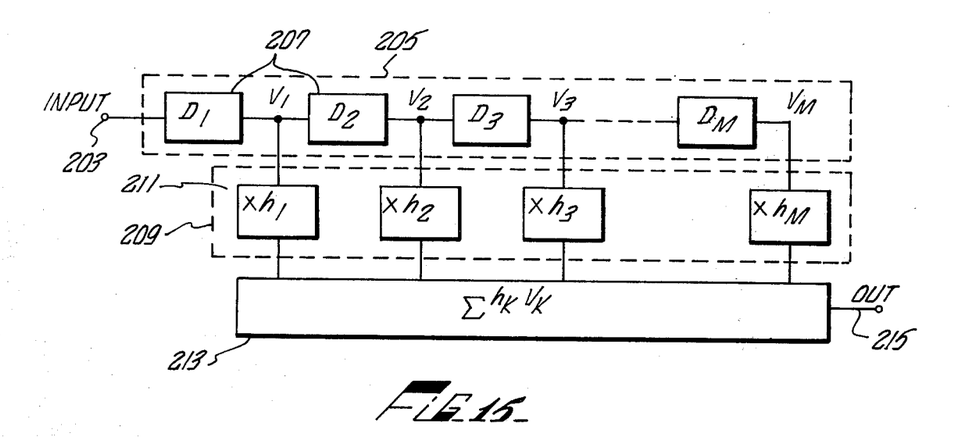
FIG. 16 is a partial perspective of a CCD device having electrodes arranged to accomplish fixed weighting.
Figure 17:
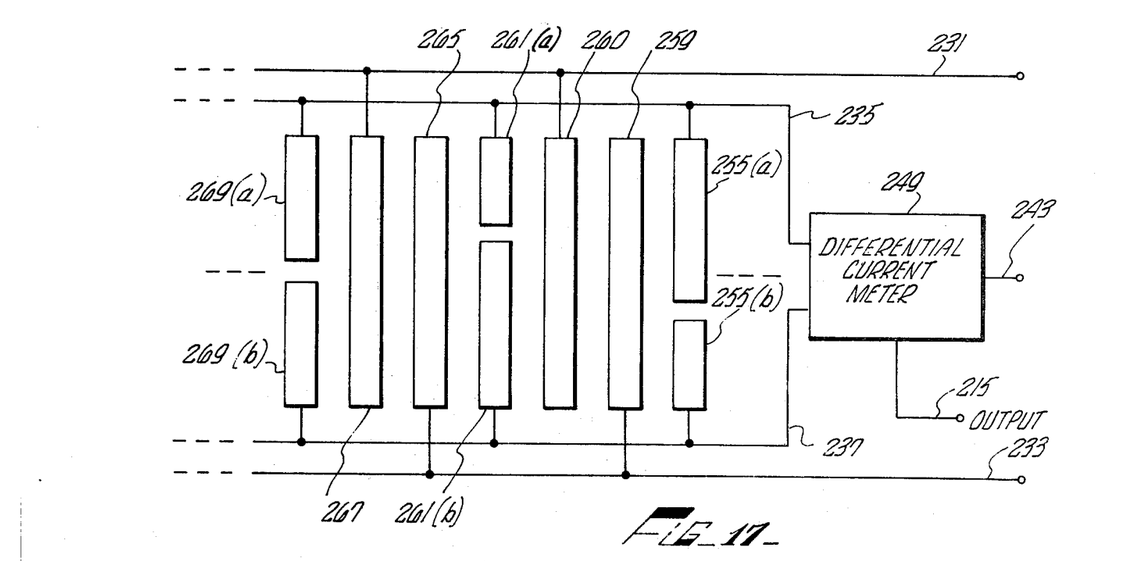
FIG. 17 is a schematic illustration of the electrodes on a CCD device to accomplish fixed weighting.

The weighting function of unit 209 of FIG. 15 can be either fixed or variable using CCD's. An example of fixed weighting is illustrated in FIGS. 16 and 17. As shown in FIG. 16, a silicon substrate 217 has a layer of silicon dioxide 219. A plurality of metal, preferably aluminum, electrodes are deposited on the silicon dioxide layer 219 to propagate a charge in the direction indicated by arrow 216. Each electrode has its own circuit connection to a three-phase clocking system (not shown). Electrode 221 is connected by line 231 to a phase-one clock. Electrode 223 is connected by line 233 to a phase-two clock. Electrode 225 is connected by line 235 to a phase-three (+) clock. Electrode 227 is connected by line 237 to a phase-three (−) clock. Electrode 229 is connected by line 239 to a phase-one clock.

The principle used to nondestructively measure the charge under a particular electrode is to integrate the current that flows in the respective clock line during the charge transfer. Assume that a charge is to be transferred from beneath electrode 223 to electrodes 225 and 227. The current in the clock lines 235 and 237 will be proportional to the transferred charge.

In order to weight each sample charge with an arbitrary coefficient ($-1 < h_K > +1$), each phase three electrode such as electrodes 269, 261 and 255 of FIG. 17 is split. The upper portions of each such electrode are connected together to common clock line 235. The lower portions are connected together to common clock line 237. Electrodes such as 267 and 260 are connected to phase-one drive line 231 while electrodes such as 265 and 259 are connected to the phase-two drive line 233. The three phases of the clock supplied to lines 231, 233 and 243 provide a complete correlation across all outputs. This three-phase clock defines a one cell transfer time. The phase-one electrodes 267 and 260 are utilized to transfer a charge from under a split electrode such as 269 or 261. A phase-two clock on line 233 will then transfer a charge from under the phase-one electrodes to a phase-two electrode, such as 265 and 259. During a phase-three clock time, as the charge is being transferred from the phase-two electrodes, such as electrodes 265 and 259, the charge as it moves from these electrodes to the phase-three electrodes such as 269, 261 and 255 causes a current flow to occur in the clock lines 235 and 237. The current flow in these two lines is measured separately by a differential current meter 249; the difference being applied to an amplifier which supplies an output signal on line 215 that can be either positive or negative. The phase three electrode 269 has been split so that the 269(a) half equals the 269(b) half. In other words, the gap between the two halves is midway across the electrode. This corresponds to a weighting coefficient of zero. Weighting electrode 261 is split so that the 261(a) half is smaller than the 261(b) half of the electrode causing the differential output from the differential current meter 249 to indicate a negative weighting coefficient. Electrode 255 is split so that the 255(a) half is larger than the 255(b) half thereby causing an output from the differential current meter 249 that is positive, thus creating a positive weighting coefficient. A more thorough analysis of the operation of such CCD transversal filters can be found in the above noted article titled "Transversal Filtering Using Charge Transfer Devices".

A representative implementation for accomplishing the sampling, presumming, and correlation functions described in FIG. 9 is shown in FIG. 18. The input sampling circuit 271 comprises, as noted in FIG. 13(b), input steering 181 and output multiplexer 183 which, functionally, are switches that sequentially connect the sample input and output lines, 279, 287 respectively, to one of the CCD storage registers 185, 187, 189.

The presummer 273 is a three-pole recursive filter of the type well known in the art. It comprises an input summing circuit 289, an output summing circuit 293 and a plurality of CCD shift register sections 291. The presummer effectively adds a number of sequential echo pulses together as described previously. However, it further provides weighted filtering so that significantly improved signal-to-aliasing performance is achieved compared with a direct unweighted summation as performed by the presummer illustrated in FIG. 14.

The range correlator 275 comprises a CCD transversal filter 297 as described in FIG. 15 in which the weighting corresponds to the transmitted chirp function. The output of the presummer 295 is supplied to the range correlator 275.

The azimuth correlator 277 comprises separate CCD transversal filters 303 for each range bin so that the azimuth storage matrix described in FIG. 9 is provided by the storage registers of the transversal filters. For optimum performance more than one transversal filter will be required per range bin in order to accomplish both sin and cos component processing. In the mechanization of FIG. 18, imagery information which is correlated in both range and azimuth is transferred out of the matrix into an output parallel/serial converter 305, during each parallel shift of a range correlated line into the matrix from input serial/parallel converter 301. The output 307 of the output converter 305 provides serial imaging data.

Other mechanization for the azimuth correlator which do not represent fully parallel processing or which use a separate CCD register memory plane for the storage matrix are possible in order to significantly reduce the number of transversal filters required. The best implementation for a particular application is a function of many tradeoffs, including the CCD charge transfer efficiency, variable or fixed weighting requirement, number of range bins, azimuth storage times, and so on.

Figure 19:
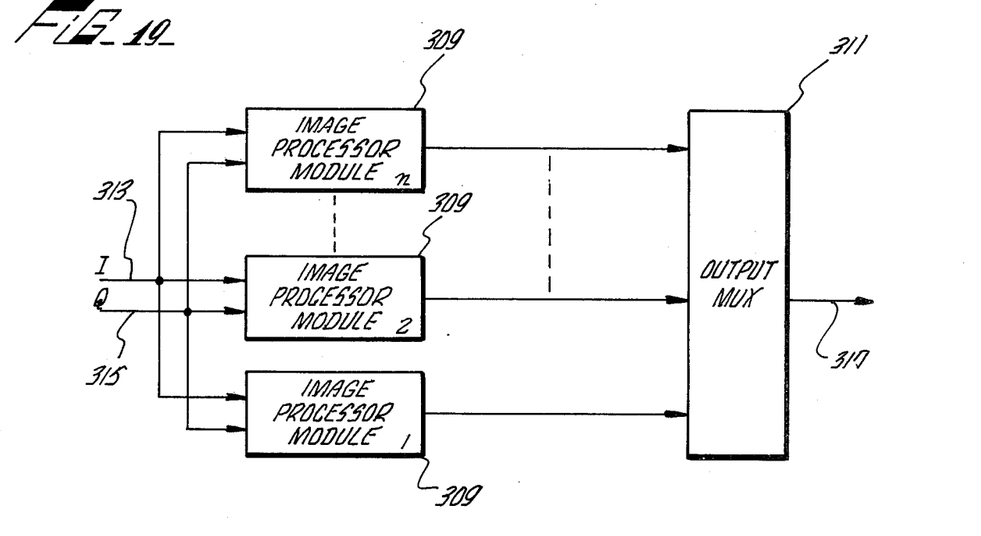
FIG. 19 is a block diagram of a modular radar data processor.

A radar data processor for a synthetic aperture imaging radar system utilizing the previously described principles of CCD implemented sampling, presumming and transversal filtering is illustrated in FIG. 19. The processor of FIG. 19 is constructed for the purpose of facilitating modular or building block construction of a radar data processor. For purposes of example, each image processor module (IPM) 309 of FIG. 19 might be designed to process a 10 kilometer range swath. Therefore, if a 50 kilometer range swath were required, five processor modules as illustrated in FIG. 19 would be utilized. The total output data rate, as a result, would be 5 times that for a single module. If a 100 kilometer swath were desired, 10 such modules would be used. Both real (I), 313 and quadrature (Q), 315 information is supplied to the IPM's 309. The output from each IPM is multiplexed by an output multiplexer 311 to provide a serial imaging data stream at its output 317.

Referring to FIG. 20, each image processor module 309 of FIG. 19 is itself made up of modular functions units, such as an analog processor module 319 and an image compressor module 321.

The image compressor module, as will be subsequently explained, provides compressed imaging data on line 323.

Figure 21:
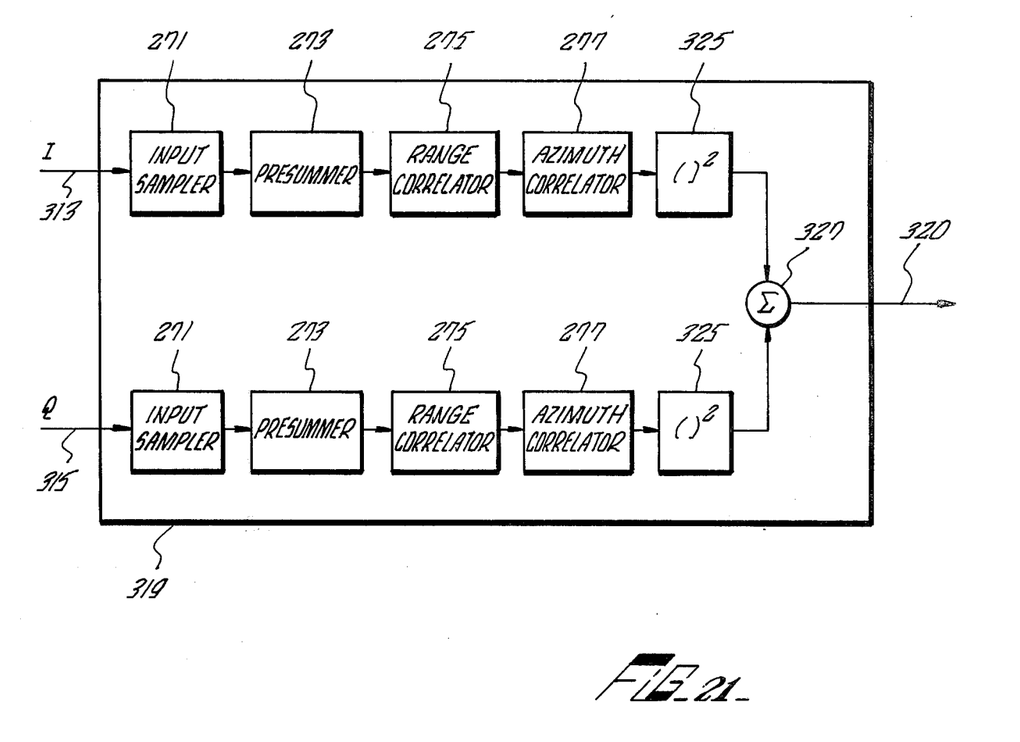
FIG. 21 is a block diagram of an analog processor module.

The analog processor module (APM) 319, as shown in FIG. 21, accomplishes input sampling, presumming, range correlation, and azimuth correlation in the manner already described in connection with FIGS. 9 and 18. These functions are accomplished for both a real (I) 313 and quadrature (Q) 315 channel from the radar receiver. The fully correlated radar imagery information in both the I and Q channels must be squared (squarers 325) and summed (summer 327) to form the final image resolution element information (on line 320).

For radar receivers using range offset (only a single output channel), there would be a single input sample, presummer, and range correlator, with an effective I and Q channel split occurring at the inputs to the azimuth correlators. However, in this case the input sampling rate would be doubled, as compared to a single I or Q channel, so that the length of all CCD registers and filters prior to azimuth correlation would be effectively doubled.

Figure 22:
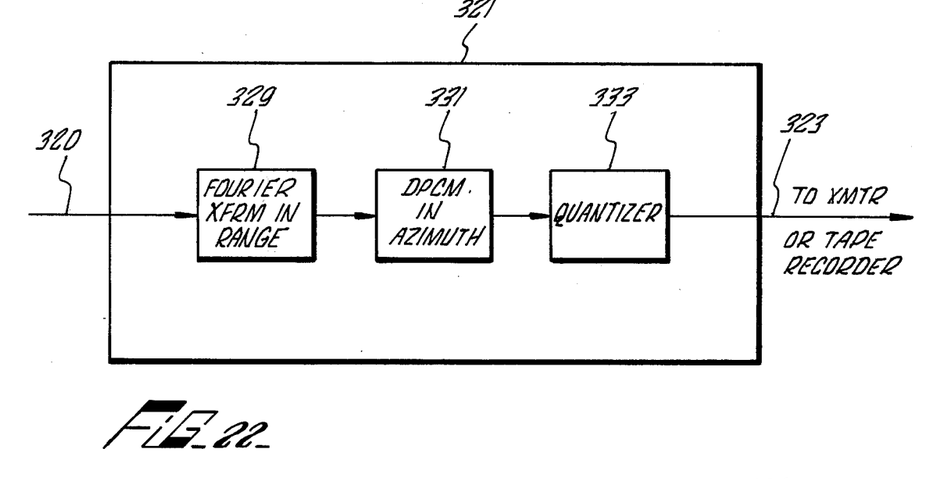
FIG. 22 is a block diagram of an image compressor module.

The image compressor module 321 of FIG. 22 performs a fourier transform in range 329, and a differential pulse code modulation 331 on a line-by-line basis in azimuth prior to quantization 333. This will potentially provide a significant reduction in data rate and volume as a function of image characteristics, required quality, etc. The algorithm described represents only one subset of the set of image compression algorithms that may be used. This particular subset has the advantage of being very suitable for implementation using CCD's.

In order to achieve an acceptable image quality from synthetic aperture radar systems, multiple looks are necessary. A multiple look system as applied to radar imagery implies that each point making up an image effectively represents a composite derived from more than one observation of that point. This effect is necessary in order to eliminate the image degradation called "speckle" which is common to single-look side-looking synthetic aperture radar imagery. Multiple look results may be achieved in range or in azimuth or in both. It is not necessary that the radar system truly observe each point several times, only that the resultant effect is the same as if it did.

Figure 23:
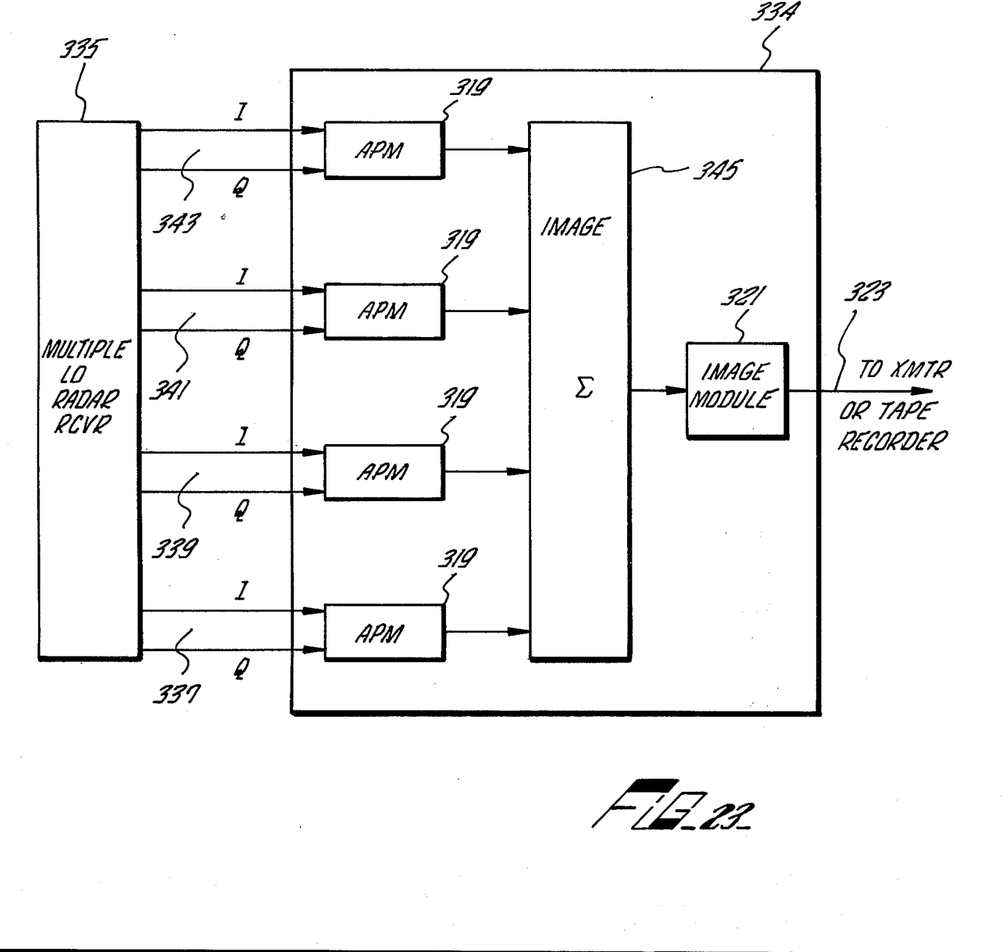
FIG. 23 is a block diagram of a four-look in azimuth image processor module.

A four-look in azimuth image processor module 334 is illustrated in FIG. 23. This implementation uses a multiple local oscillator radar receiver 335 wherein each channel 337, 339, 341 and 343, effectively provides an independent look. The primary impact on the image processor module is an effective increase in hardware directly proportional to the number of looks. The analog processor module (APM) 319 has been described in connection with FIG. 21 and is the same for each channel. The corresponding resolution elements of the image at the outputs of the four APM's are superimposed 345, resulting in a single four-look image. This composite image will reflect the results of four independent looks thereby reducing the "speckle" problem discussed above. The image compressor 321 operates on the information received at its input in the same manner as described for the single-look processor of FIG. 20.

In summary, a synthetic aperture radar data processor has been described that will reduce power, weight and cost requirements of on-board image processing so that a very significant reduction in on-board data storage and data rate requirements of an airborne imaging radar system may be realized. The present invention will allow the processing of raw radar data into correlated imaging data on board airborne radar platform without the use of digital or optical correlation techniques both in a single-look and a multiple-look system.

It should be understood, of course, that the foregoing disclosure only relates to preferred embodiments of the invention and that numerous modifications may be made therein without departing from the spirit and the scope of the invention as set forth in the appended claims.

What is claimed is:

1. A data processor for a synthetic aperture imaging radar system having a transmitter and receiver, said processor comprising:
   a demultiplexer sampling the analog output signals from said receiver, each sample being a charge proportional to the output signal voltage amplitude, and sequentially connecting the samples to a plurality of output lines;
   a charge-coupled device serial shift register connected to each output line of said demultiplexer for receiving the samples of voltage amplitudes at its input and storing them as charges proportional to their respective voltage amplitude samples;
   a multiplexer with its inputs connected to respective outputs of said charge-coupled device shift registers for sequentially selecting the charges from the shift registers;
   means for correlating each charge sample from said multiplexer with its respective range parameter; and
   means for correlating the range identified charge samples with their respective azimuth parameter.

2. The data processor of claim 1 wherein said range correlating means, comprises:
   a charge-coupled device serial shift register receiving input signals at one end thereof;
   means for weighting the output signals from each stage of said shift register; and
   means for summing the signals from said weighting means.

3. The data processor of claim 2 wherein said azimuth correlating means, comprises:
   a plurality of charge-coupled device serial shift register means, one or more for each stage of the charge-coupled device serial shift register of said range correlating means, receiving signals from said summing means;

a plurality of means for weighting output signals from each stage of said plurality of charge-coupled device serial shift registers; and a plurality of means for summing the weighted signals from each of said plurality of weighting means.

4. The data processor of claim 2 wherein said azimuth correlating means comprises: two or more combinations of the following combination of three elements 1, 2, and 3:

1. a plurality of charge-coupled device serial shift register means, one or more for each stage of the charge-coupled device serial shift register of said range correlating means, receiving signals from said summing means;
2. a plurality of means for weighting output signals from each stage of said plurality of charge-coupled device serial shift register means; and
3. a plurality of means for summing the weighted signals from each of said plurality of weighting means.

5. The data processor of claim 4, further comprising: summing means for summing the output signals from said azimuth correlating means.

6. The data processor of claim 1 wherein said azimuth correlating means, comprises:

a plurality of CCD serial shift register means, one or more for each range element at a particular azimuth parameter, receiving signals from said range correlating means;

a plurality of means for weighting output signals from each stage of said plurality of CCD serial shift register means; and a plurality of means for summing the weighted signals from each of said plurality of weighting means.

7. The data processor of claim 1 wherein said azimuth correlating means comprises: two or more combinations of the following combination of three elements 1, 2, and 3:

1. a plurality of CCD serial shift register means, one or more for each range element at a particular azimuth parameter, receiving signals from said range correlating means;
2. a plurality of means for weighting output signals from each stage of said plurality of CCD serial shift register means; and
3. a plurality of means for summing the weighted signals from each of said plurality of weighting means.

8. The data processor of claim 7, further comprising: summing means for summing the output signals from said azimuth correlating means.

9. A data processor for a synthetic aperture imaging radar system having a transmitter and receiver, said processor comprising:

n processor modules, where n is an integer, each module comprising:

1. means for sampling the analog output signal from said receiver said means comprising:
   a. a demultiplexer sampling the analog output signal from said receiver, each sample having a charge proportional to the output signal voltage amplitude and sequentially connecting samples to a plurality of output lines;
   b. a CCD serial shift register connected to each output line of said demultiplexer for receiving the samples of voltage amplitudes at its input and storing them as charges proportional to their respective voltage amplitude samples; and
   c. a multiplexer with its inputs connected to respective outputs of said CCD shift registers for sequentially selecting the charges from the shift registers;

2. means for correlating each charge sample from said multiplexer with its respective range parameter; and 3. means for correlating the range identified charge samples with their respective azimuth parameters.

10. The data processor of claim 9, wherein said sampling means for each processor samples a 1/n portion of each analog output signal from said radar receiver.

11. The data processor of claim 9 wherein said range correlating means, comprises:

a CCD serial shift register receiving input signals at one end thereof;

means for weighting the output signals from each stage of said shift registers; and means for summing the signals from said weighting means.

12. The data processor of claim 9 wherein said azimuth correlating means, comprises:

a plurality of CCD serial shift registers, one or more for each range element at an azimuth parameter;

a plurality of means for weighting output signals from each stage of said plurality of CCD serial shift registers; and a plurality of means for summing the weighted signals from each of said weighting means.

13. The data processor of claim 9 wherein said azimuth correlating means comprises: two or more combinations of the following combination of three elements 1, 2, and 3:

1. a plurality of CCD serial shift registers, one or more for each range element at an azimuth parameter;
2. a plurality of means for weighting output signals from each stage of said plurality of CCD serial shift registers; and
3. a plurality of means for summing the weighted signals from each of said plurality of weighting means.

14. The data processor 13, further comprising: summing means for summing the output signals from said azimuth correlating means.

15. A data processor for a synthetic aperature imaging radar system having a transmitter and receiver, said processor comprising:

means for sampling the echo output signals from the radar receiver, each sample being a charge proportional to the echo signal voltage amplitude;

a serial/parallel CCD shift register having a serial input and a parallel output, said register receiving the samples from said sampling means;

a parallel/serial CCD shift register having a parallel input and a serial output, the parallel input being connected to the parallel output of said serial/parallel register;

means for correlating the resultant average samples from said parallel/serial CCD shift register with their respective range parameter; and means for correlating the range identified samples with their respective azimuth parameter.

* * * * *